(12) United States Patent
Yilmaz

(10) Patent No.: US 11,889,781 B2
(45) Date of Patent: Feb. 6, 2024

(54) MACHINE AND A METHOD OF PRODUCING BIODEGRADABLE NONWOVEN TEXTILE COMPRISING SEEDS

(71) Applicant: Håkan Isak Yilmaz, Huddinge (SE)

(72) Inventor: Håkan Isak Yilmaz, Huddinge (SE)

( * ) Notice: Subject to any disclaimer, the term of this patent is extended or adjusted under 35 U.S.C. 154(b) by 573 days.

(21) Appl. No.: 17/269,756

(22) PCT Filed: Aug. 23, 2019

(86) PCT No.: PCT/SE2019/050778
§ 371 (c)(1),
(2) Date: Feb. 19, 2021

(87) PCT Pub. No.: WO2020/040689
PCT Pub. Date: Feb. 27, 2020

(65) Prior Publication Data
US 2021/0289685 A1    Sep. 23, 2021

(30) Foreign Application Priority Data

Aug. 24, 2018 (SE) .................... 1851015-6

(51) Int. Cl.
*A01C 1/04* (2006.01)
*D04H 1/413* (2012.01)
*D04H 1/46* (2012.01)

(52) U.S. Cl.
CPC .............. *A01C 1/044* (2013.01); *D04H 1/413* (2013.01); *D04H 1/46* (2013.01); *A01C 2001/048* (2013.01); *D10B 2401/12* (2013.01)

(58) Field of Classification Search
CPC .......... D04H 1/46; D04H 18/02; D04H 1/413; D04H 1/498; D04H 3/02; D04H 3/04;
(Continued)

(56) References Cited

U.S. PATENT DOCUMENTS 2,923,093 A * 2/1960 Allen ..................... A01G 20/00
47/56
4,471,569 A    9/1984 Ahm et al.
(Continued)

FOREIGN PATENT DOCUMENTS

GB    1367090 A    9/1974
GB    2332353 A *  6/1999 ............. A01C 1/044
(Continued)

OTHER PUBLICATIONS

International EP Search Report for corresponding Application No. 19853045.3, dated Dec. 2, 2020, 49 pages.
(Continued)

*Primary Examiner* — Amy Vanatta
(74) *Attorney, Agent, or Firm* — Tucker Ellis LLP

(57) ABSTRACT

A machine and a method for producing biodegradable nonwoven textile including seeds including a seed distributing machine unit, positioned in a cross-lapping portion of the nonwoven textile machine. The seed distributing machine unit includes at least one receptacle for seeds having a dispensing opening for regulated outlet of seeds onto a veil of biodegradable fibres. A needle punching portion is situated after the cross-lapping, seen in the direction of the biodegradable nonwoven textile production line of the machine, for needle-punching of the veil of biodegradable fibres.

12 Claims, 5 Drawing Sheets

(58) Field of Classification Search
CPC ... D04H 3/05; D04H 5/02; D04H 5/08; A01C 1/044; A01C 2001/048; B32B 5/022; B32B 5/08; B32B 5/26; B32B 2250/20; B32B 2262/04; B32B 2262/14; B32B 2307/7145; B32B 2307/7163; B32B 5/02; D01G 23/02; D01G 23/04; D01G 15/10; D01G 13/00; D01G 25/00; D01G 23/00; D10B 2401/12
USPC ........................................ 28/107–115; 47/56
See application file for complete search history.

(56) References Cited

U.S. PATENT DOCUMENTS

| | | | | |
|---|---|---|---|---|
| 5,009,031 A | * | 4/1991 | Knop | A01G 24/46 47/64 |
| 5,226,255 A | * | 7/1993 | Robertson | A01G 20/20 47/56 |
| 5,237,945 A | | 8/1993 | White | |
| 5,623,748 A | * | 4/1997 | Bacchio | D01G 25/00 19/163 |
| 5,887,382 A | * | 3/1999 | Marshall | A01C 1/044 47/74 |
| 7,059,083 B2 | * | 6/2006 | Abitz | A01C 1/044 47/9 |
| 7,419,593 B2 | * | 9/2008 | Trauger | B32B 33/00 210/601 |
| 2002/0124367 A1 | | 9/2002 | Wong | |
| 2006/0207170 A1 | | 9/2006 | Smith | |
| 2009/0217498 A1 | * | 9/2009 | Dos Santos | D04H 1/482 28/115 |
| 2013/0101805 A1 | * | 4/2013 | Altshuler | B32B 3/30 264/109 |
| 2014/0130410 A1 | * | 5/2014 | Sumi | D04H 1/4209 502/400 |

FOREIGN PATENT DOCUMENTS

| | | | |
|---|---|---|---|
| KR | 910005431 Y1 | * | 7/1991 |
| KR | 100936993 B1 | | 1/2010 |
| KR | 10-0960977 B1 | | 6/2010 |
| KR | 20100091540 A | | 8/2010 |
| KR | 20110109646 A | | 10/2011 |
| KR | 20120131335 A | | 12/2012 |
| KR | 101226452 B1 | | 1/2013 |
| KR | 101579165 B1 | | 12/2015 |
| WO | WO-0219797 A1 | * | 3/2002 ............ A01C 1/044 |

OTHER PUBLICATIONS

International Search Report for corresponding International Application No. PCT/SE2019/050778, dated Oct. 3, 2019, 3 pages.

* cited by examiner

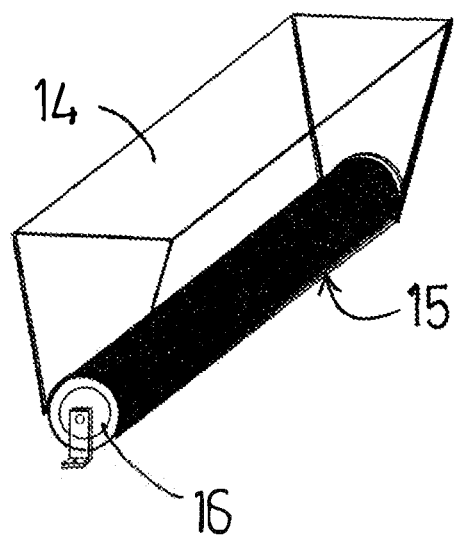
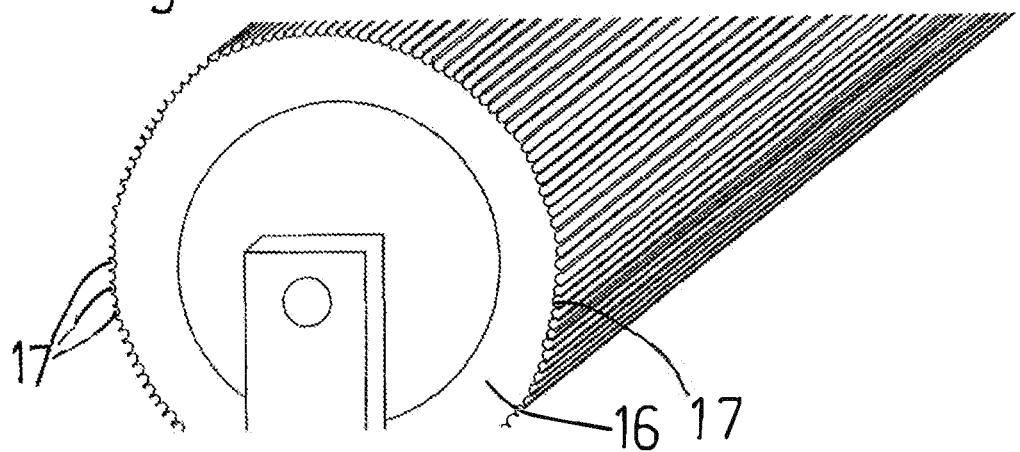

MACHINE AND A METHOD OF PRODUCING BIODEGRADABLE NONWOVEN TEXTILE COMPRISING SEEDS

The present invention concerns a machine and a method of producing biodegradable nonwoven textile comprising seeds.

It is previously known methods of making some kind of textiles comprising seeds using many different layers and steps. For example, a method is shown in KR100960977 where a prefabricated nonwoven fabric layer is rolled off onto a conveyor. On this prefabricated nonwoven fabric layer coarse fibres (3-5 mm thick fibres) of for example coconut is distributed. Thereon the seeds are distributed, where after a second layer of coarse fibres are applied. Then fertilizers are distributed on top. Finally, a second prefabricated nonwoven fabric layer is laid on top and all layers go through a needle-punching step.

SUMMARY OF THE INVENTION

The present invention aims at providing an effective method and a machine therefor which will produce a biodegradable nonwoven textile comprising seeds which is superior to previously known nonwoven textile comprising seeds. This biodegradable nonwoven textile comprising seeds will be thin and provide much more light to the seeds which will start germination more easily.

According to a first aspect of the present invention a machine for producing biodegradable nonwoven textile comprising seeds is provided. It comprises a seed distributing machine unit, positioned in a cross-lapping portion of the nonwoven textile machine. The seed distributing machine unit comprises at least one receptacle for seeds having a dispensing opening for regulated outlet of seeds onto a veil of biodegradable fibres. The machine also comprises a needle punching portion situated after the cross-lapping, seen in the direction of the biodegradable nonwoven textile production line of the machine.

According to an embodiment of the invention, the veil of biodegradable fibres comes from a carding unit of the machine.

According to an embodiment, biodegradable fibres of at least two different sizes are mixed in a portion in the beginning of the nonwoven textile production line of the machine. Thus, the smaller fibres will deteriorate quicker than the larger fibres giving more light to the seeds but still having a remaining net of fibres to keep the seeds and the sprouts in place.

According to an embodiment, a rotatable axle provided with grooves, preferably in a direction parallel to a length axis, is located in the dispensing opening. Preferably, the speed of the rotation of the rotatable axle is regulated by a motor and thus controlling the amount of seeds being let out through the dispensing opening per time unit.

According to an embodiment, at least two receptacles having a dispensing opening is provided in the seed distributing unit, preferably at least one for seeds and one for fertilizers.

According to an embodiment, the seed distributing unit is movable in a horizontal plane in a direction transverse the movement of the veil of biodegradable fibres. Thus, it is possible to adjust the position of the seeds across the width of the incoming veil of biodegradable fibres.

According to a second aspect of the present invention a method of producing a biodegradable nonwoven textile comprising seeds is provided. The method comprises the steps: producing a veil of biodegradable fibres, distributing seeds over at least a part of an incoming width of the veil of biodegradable fibres during cross-lapping of the veil of biodegradable fibres and then needle-punching the veil of biodegradable fibres into a biodegradable nonwoven textile comprising seeds.

According to an embodiment of the method, the distributing of seeds is performed over a central portion of the incoming width of the veil of biodegradable fibres and the cross-lapping is run in a suitable speed in order to provide a cross-lapped veil of biodegradable fibres where the central portion of the incoming width having seeds is embedded between a previous tail portion of the incoming width, underneath, and a following head portion of the incoming width, above. Thus, the seeds are embedded and secured in a layer in between an upper layer and a lower layer of veil of biodegradable fibres without seeds.

According to an embodiment, the distribution of seeds is displaceable in a direction across the incoming width in order to achieve an "overlapping", where the seeds partially will be provided on an upper side of the final biodegradable nonwoven textile, or "underlapping", where the seeds partially will be provided on an underside of the final biodegradable nonwoven textile. If an "overlapping" is provided a portion of the seeds will not be embedded under an upper layer of veil of biodegradable fibres without seeds and the more open lying seeds will receive may easier grow through the nonwoven textile. This is for example suitable for seeds growing round leaves. If instead an "underlapping" is provided a portion of the seeds will be positioned in the lowest layer having two layers of veil of biodegradable fibres without seeds above, which may be more suitable for the types of seeds that grow pointed leaves, which can groove through the layers of fibres in the nonwoven textile.

According to an embodiment, a mixing of two sizes of biodegradable fibres is performed initially. Preferably, the mixing is followed by a carding step.

According to an embodiment, spraying an aroma for keeping for example snails and bugs away onto the vail of biodegradable fibres is performed before the needle-punching.

According to an embodiment, also fertilizers are distributed during the cross-lapping.

SHORT DESCRIPTION OF THE DRAWINGS

The present invention will now be described in more detail under referral to the drawings, wherein FIG. 1 shows an embodiment of a machine for producing biodegradable nonwoven textile comprising seeds.

FIG. 2 shows an embodiment of a cross-lapping portion of a nonwoven machine.

FIGS. 3a and b shows an embodiment of a receptacle of a seed distributing machine unit and a detail, respectively.

DETAILED DESCRIPTION OF EMBODIMENTS OF THE INVENTION

Figure 1:
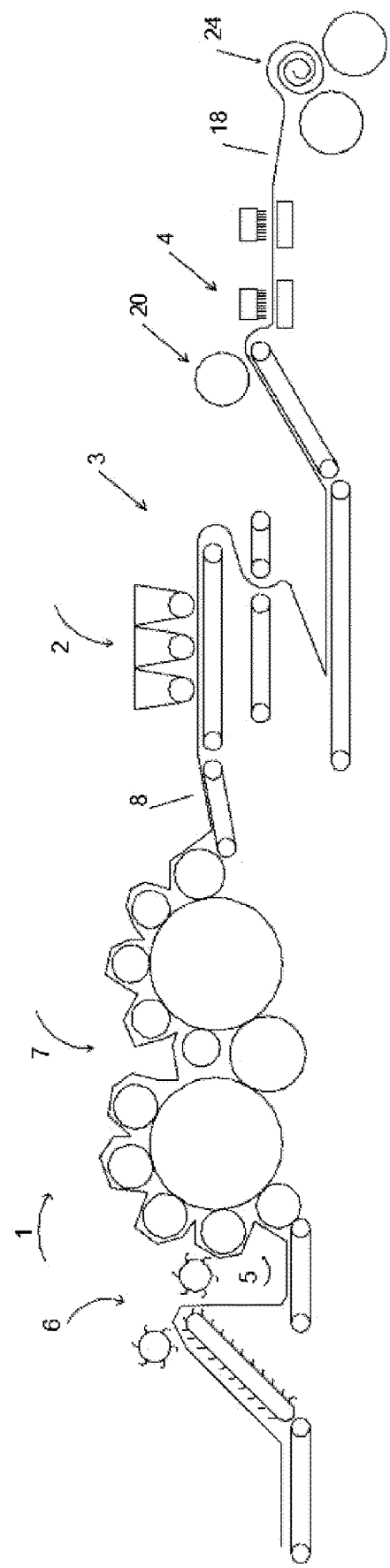

In FIG. 1 a schematic drawing of an embodiment of a full machine 1 is shown although all shown parts are not necessarily required for the invention. The claims give the scope of the invention. The machine 1 is for producing biodegradable nonwoven textile and has an added seed distributing machine unit 2, which is positioned at a cross-lapping portion 3 of the nonwoven textile machine 1, and a needle-punching portion 4 positioned after the cross-lapping portion 3 seen in the direction of the biodegradable nonwoven textile production line 5 of the machine 1. Such a machine 1 is called a TurfQuick™ machine.

Preferably, the machine 1 has a mixer 6 for different sizes of biodegradable fibres in its start. It is beneficial for the end product, the biodegradable nonwoven textile comprising seeds 18, to be built up by at least two different sizes of biodegradable fibres. Thus, the smallest fibres will deteriorate quicker than the larger, thus opening up for the germination of the seeds. Preferably the fibres are viscose fibres although it is of course conceivable with other biodegradable fibres such as other cellulose fibres or other biodegradable fibres. The size of the fibres could be in an interval between 0,5-7,0 decitex in thickness and between 20-70 mm in length. Any colour of the fibres could be used although green, brown and white are preferred.

Figure 2:
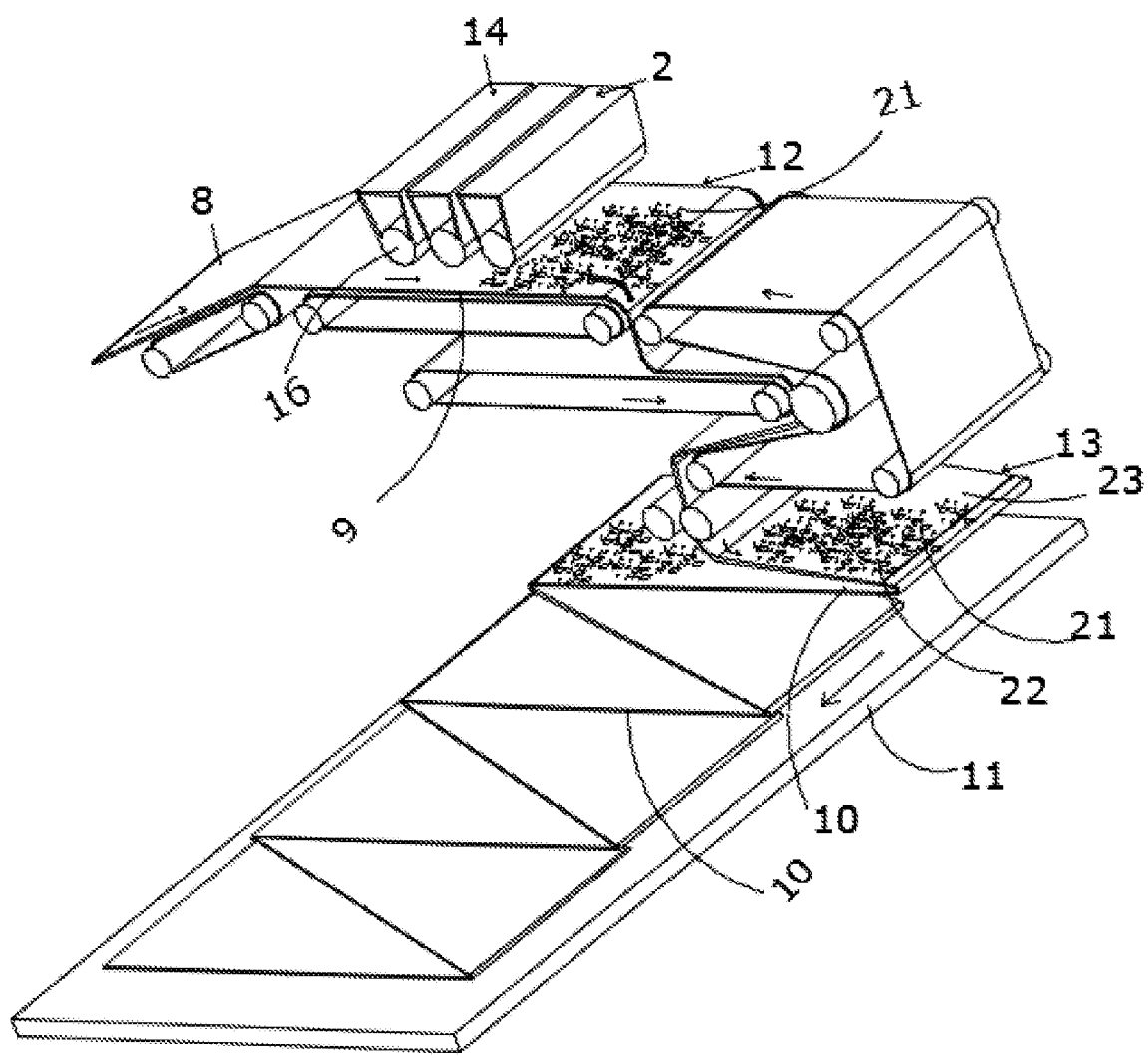
Figure 5:
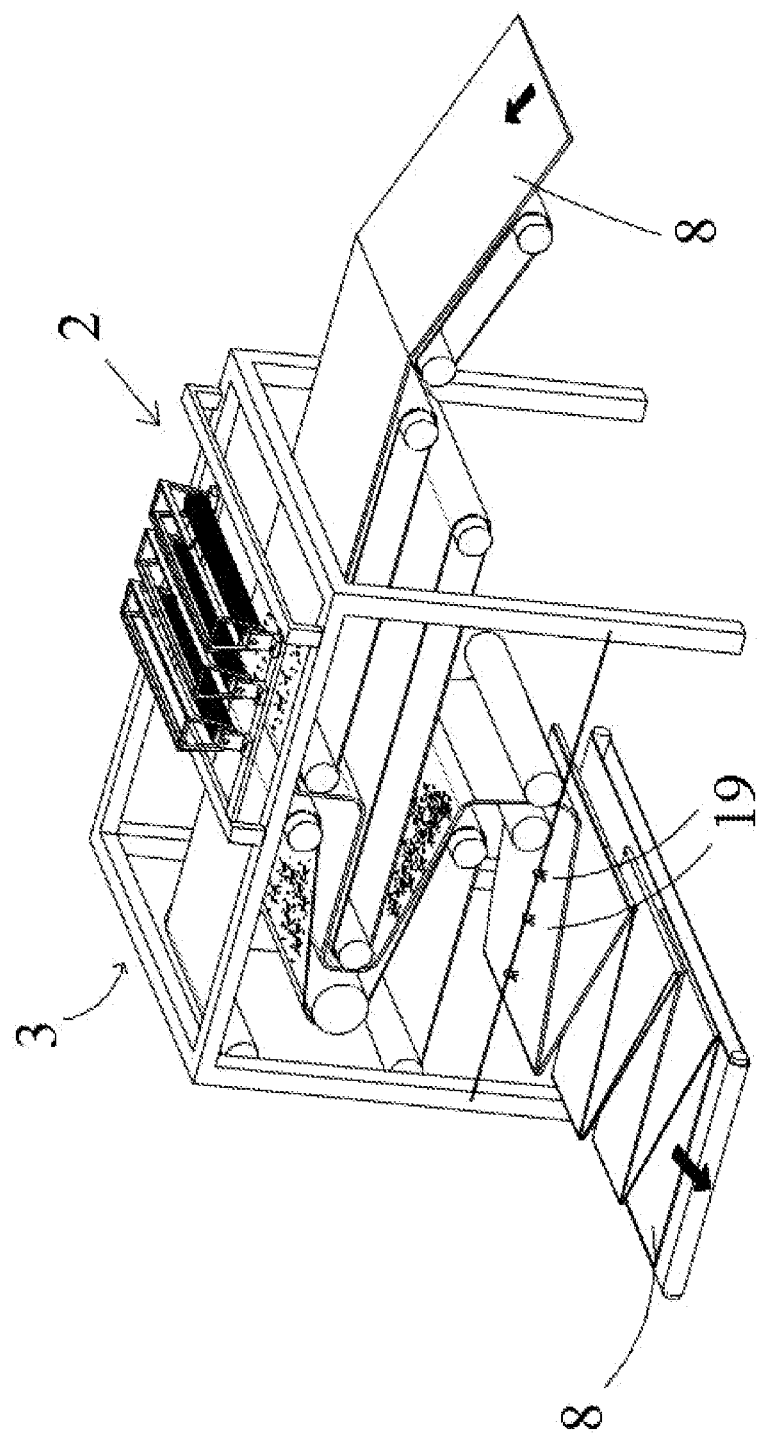
FIG. 5 shows an embodiment of a cross-lapping portion having an embodiment of a seed distributing machine unit.

A carding step 7 preferably takes place in a carding portion of the nonwoven machine 1 in order to card the mixed fibres. Thereafter a veil of biodegradable fibres 8, see also FIG. 2, will travel to the cross-lapping portion 3 of the nonwoven machine 1. During the cross-lapping the veil of biodegradable fibres 8 will change to a transverse direction, 90 degrees from the incoming direction, shown in more detail in FIGS. 2 and 5. Thus, a side 9 of the incoming veil 8 facing the outgoing direction of the cross-lapping portion will turn into a head side 10 when the veil 8 has been cross-lapped onto a conveyor 11 moving in the transverse direction. In line with this, a side 12 facing away from the direction of the outgoing cross-lapped veil will turn into a tail side 13 when the veil 8 has been cross-lapped onto the conveyor 11 moving in the transverse direction.

The seeds will be distributed at the cross-lapping portion 3 of the nonwoven machine 1. It could be on the way into the cross-lapping portion, after a possible carding portion 7, but preferably on or in the cross-lapping portion 3. According to a preferred embodiment the seed distributing machine unit 2 is positioned above the cross-lapping portion 3 and comprises at least one receptacle 14, shown in a see-through variant, for seeds having a dispensing opening 15 for regulated outlet of seeds onto the veil of biodegradable fibres 8, see FIG. 3a. Seeds have small spines and thorns, which will hook onto the thin fibres so that the seeds remain in the veil of biodegradable fibre. This is not possible in case the fibres are too coarse or the fibres have already been needle-punched forming a nonwoven textile.

Figure 4:
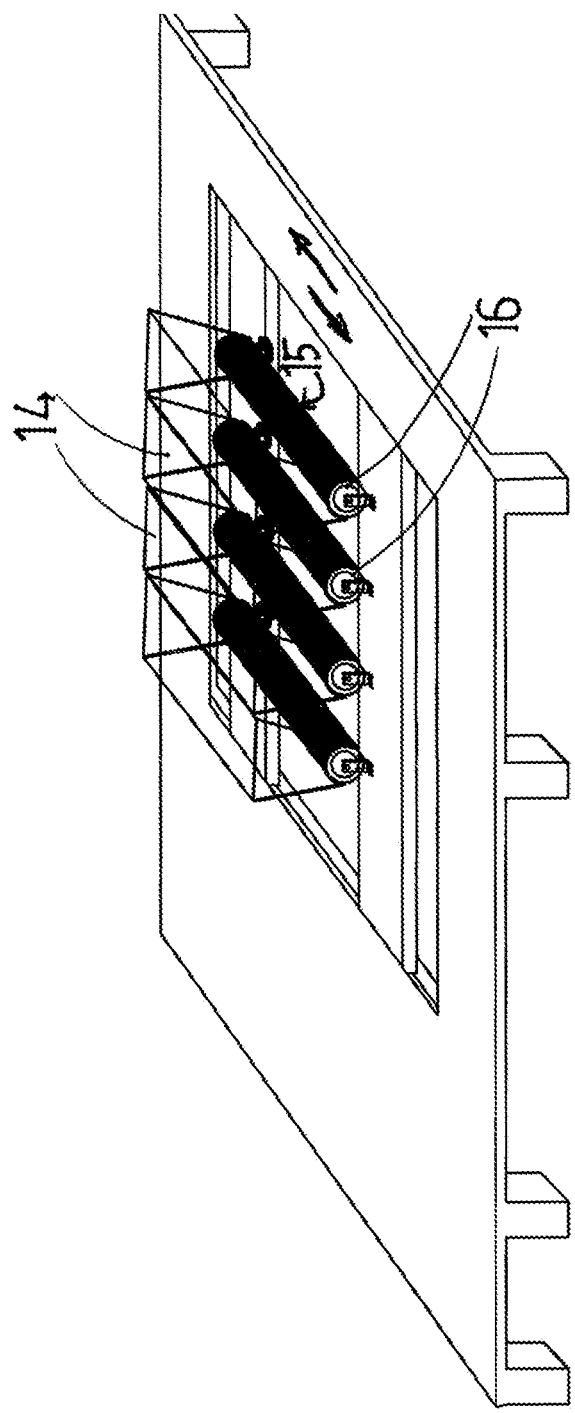
FIG. 4 shows an embodiment of a seed distributing machine unit.

The seed distributing machine 2 unit may have further receptacles 14, such as for fertilizers or a different type of seeds, for example flower seeds, see FIG. 4. The number of receptacles could be one, two, three or four, for example. Each receptacle 14 is preferably oblong having an outlet running from one end to the other such that the outlet 15 could spread seeds or fertilizers along a distance. Preferably this opening or distance is provided more or less orthogonal to the incoming veil of biodegradable fibres 8. The opening 15 may be provided with a rotatable axle 16 provided with grooves 17, preferably in a direction parallel to a length axis of the rotatable axle 16, see FIG. 3b for a detail of the rotatable axle 16 with grooves 17. Obviously other types of regulated outlet openings are conceivable, too.

The rotatable axle 16 is located in the dispensing opening 15, preferably so close to the opening 15 that only seeds positioned in the grooves 17 may fall out through the opening 15 when the rotatable axle 16 is rotated and thus the grooves 17 comes out in the opening 15. The speed of the rotation of the rotatable axle 16 may be regulated by a motor (not shown) and thus controlling the amount of seeds being let out through the dispensing opening 15 per time unit. This regulation in combination with the speed regulation of the incoming veil of biodegradable fibres 8 will give the amount of seeds per square meter in the final biodegradable nonwoven textile comprising seeds 18. Preferably, the amount of seeds is 3-50 g/m$^2$. The seed distributing machine unit 2 is movable in a horizontal plane in a direction transverse the movement of the veil of biodegradable fibres 8.

During the cross-lapping 3 the seed distributing machine unit distributes seeds over at least a portion of an incoming width of the veil of biodegradable fibres 8. Preferably the seeds are positioned on a central portion 21 of the incoming width of the veil of biodegradable fibres 8. According to one embodiment a third of the width, arranged centrally, is provided with seeds. If the cross-lapping is run in a suitable speed it is possible to provide a cross-lapped veil of biodegradable fibres 8 where the central portion of the incoming width having seeds is embedded between a previous tail portion 23 of the incoming width, underneath, and a following head portion 22 of the incoming width, above.

In order to arrive in a final product 18 which is superior for seeds having round leaves or the opposite very pointy leaves as the general seeds it is possible to displace the seed distributing machine unit 2 in a direction across the incoming width of the veil of biodegradable fibres 8, see arrows in FIG. 4, in order to achieve an "overlapping", where the seeds at least partially will be provided on an upper side of the final biodegradable nonwoven textile 18, due to a displacement of the seeds closer to the head portion 22 so that the following head portion 22 will not totally cover the seed portion.

In an opposite displacement of the seed distributing machine unit 2 towards the tail side 23 an "underlapping" is provided, where the seeds at least partially will be provided on an underside of the final biodegradable nonwoven textile 18, due to a displacement of the seeds closer to the tail portion 23 so that the previous tail 23 portion will not totally cover the seed portion. Both in the "overlapping" and the "underlapping" modes of producing a final biodegradable nonwoven textile comprising seeds 18 it is possible to distribute the seeds in the third portion of the width situated in the head portion 22 and distribute the seeds in the third portion of the width situated in the tail portion 23, respectively. The arrows in FIG. 4 shows how the seed distributing machine unit 2 may be displaced over the width of the veil of biodegradable fibres 8. Instead of displacing the seed distributing machine unit 2 transverse the width of the veil 8 it is possible to have receptacles 14 that have a length that reaches over the full width of the veil 8 and being provided with internal walls to delimit which portion of the veil to distribute seeds or fertilizers onto (not shown).

Preferably, the veil of biodegradable fibres 8 is sprayed with an aroma, which is for keeping for example snails and bugs away from the final product. This could for example be performed by means of at least one spray nozzle 19 provided on arms, see FIG. 5, before the needle-punching. When the veil 8 has been cross-lapped it has a thickness of maybe 15 cm and it may be preferred to compress the veil 8 in a press 20. In this press 20 the veil may be pressed into a thickness of for example around 5 cm. In the needle-punching portion 4 the needles will transform the veil of biodegradable fibres 8 into a nonwoven textile having for example a thickness of 1-3 mm. Thereafter the final biodegradable nonwoven textile 18 will be for example rolled up in rolls 24 for distribution to buyers.

Thus, it is possible to produce a thin, lightweight biodegradable nonwoven textile comprising seeds all at once in the same machine without the need of many different steps and different ingoing prefabricated layers. This biodegradable nonwoven textile comprising seeds will decay in around 10 weeks' time.

The invention claimed is:

1. A nonwoven textile machine for producing biodegradable nonwoven textile comprising seeds, the nonwoven textile machine comprising a cross-lapping portion and a seed distributing machine unit, positioned in the cross-lapping portion of the nonwoven textile machine, which is able to distribute seeds over at least a part of an incoming width of a veil of biodegradable fibres during cross-lapping of the veil of biodegradable fibres, wherein the seed distributing machine unit comprises at least one receptacle for seeds having a dispensing opening for regulated outlet of seeds onto a veil of biodegradable fibres, the seed distributing unit is movable in a horizontal plane in a direction transverse the movement of the veil of biodegradable fibres, and the nonwoven textile machine comprises a needle punching portion situated after the cross-lapping, seen in the direction of the biodegradable nonwoven textile production line of the machine.

2. The machine according to claim 1, wherein the veil of biodegradable fibres comes from a carding unit of the machine.

3. The machine according to claim 1, wherein a mixer is able to mix biodegradable fibres of at least two different sizes, the mixer being positioned in the beginning of the nonwoven textile production line of the machine.

4. The machine according to claim 1, wherein a rotatable axle provided with grooves in a direction parallel to a length axis is located in the dispensing opening.

5. The machine according to claim 4, wherein the speed of the rotation of the rotatable axle is regulated by a motor and thus controlling the amount of seeds being let out through the dispensing opening per time unit.

6. The machine according to claim 1, wherein at least two receptacles having a dispensing opening is provided in the seed distributing unit, at last one for seeds and one for fertilizer.

7. A method of producing a biodegradable nonwoven textile comprising seeds using a nonwoven textile machine, the nonwoven textile machine comprising a cross-lapping portion and a seed distributing machine unit, positioned in the cross-lapping portion of the nonwoven textile machine which is able to distribute seeds over at least a part of an incoming width of a veil of biodegradable fibres during cross-lapping of the veil of biodegradable fibres, wherein the seed distributing machine unit comprises at least one receptacle for seeds having a dispensing opening for regulated outlet of seeds onto a veil of biodegradable fibres, the seed distributing unit is movable in a horizontal plane in a direction transverse the movement of the veil of biodegradable fibres, and the nonwoven textile machine comprises a needle punching portion situated after the cross-lapping, seen in the direction of the biodegradable nonwoven textile production line of the machine, the method comprising producing a veil of biodegradable fibres, distributing seeds over at least a part of an incoming width of the veil of biodegradable fibres during cross-lapping of the veil of biodegradable fibres and then needle-punching the veil of biodegradable fibres into a biodegradable nonwoven textile comprising seeds, whereby the distributing of seeds is performed over a central portion of the incoming width of the veil of biodegradable fibres and the cross-lapping is run in a suitable speed in order to provide a cross-lapped veil of biodegradable fibres where the central portion of the incoming width having seeds is embedded between a previous tail portion of the incoming width, underneath, and a following head portion of the incoming width, above.

8. The method according to claim 7, whereby the distribution of seeds is displaceable in a direction across the incoming width in order to achieve an overlapping, where the seeds partially will be provided on an upper side of the final biodegradable nonwoven textile, or underlapping, where the seeds partially will be provided on an underside of the final biodegradable nonwoven textile.

9. The method according to claim 7, whereby a mixing of two sizes of biodegradable fibres is performed initially.

10. The method according to claim 9, whereby the mixing is followed by a carding step.

11. The method according to claim 8, whereby spraying an aroma onto the veil of biodegradable fibres is performed before the needle-punching.

12. The method according to claim 8, whereby also fertilizers are distributed during the cross-lapping.

* * * * *